(12) United States Patent
Pankanti et al.

(10) Patent No.: US 10,838,922 B2
(45) Date of Patent: Nov. 17, 2020

(54) DATA COMPRESSION BY USING COGNITIVE CREATED DICTIONARIES

(71) Applicant: International Business Machines Corporation, Armonk, NY (US)

(72) Inventors: Sharathchandra Umapathirao Pankanti, Yorktown Heights, NY (US); Erik Rueger, Kelsterbach (DE); Rolf Schaefer, Kelsterbach (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 265 days.

(21) Appl. No.: 15/475,939

(22) Filed: Mar. 31, 2017

(65) Prior Publication Data

US 2018/0285378 A1 Oct. 4, 2018

(51) Int. Cl.
| | |
|---|---|
| *G06F 16/17* | (2019.01) |
| *G06F 16/174* | (2019.01) |
| *G06N 20/00* | (2019.01) |
| *G06N 3/04* | (2006.01) |
| *G06N 5/04* | (2006.01) |

(52) U.S. Cl.
CPC ....... *G06F 16/1744* (2019.01); *G06N 3/0454* (2013.01); *G06N 5/045* (2013.01); *G06N 20/00* (2019.01)

(58) Field of Classification Search
CPC .................................................. G06F 16/1744
See application file for complete search history.

(56) References Cited

U.S. PATENT DOCUMENTS

| | | | |
|---|---|---|---|
| 4,672,679 A | 6/1987 | Freeman | |
| 6,661,839 B1* | 12/2003 | Ishida | G01R 31/31921 341/51 |
| 7,864,087 B2 | 1/2011 | Lablans | |
| 8,742,958 B2* | 6/2014 | Fallon | G06Q 40/04 341/50 |
| 8,782,734 B2 | 7/2014 | Isaacson et al. | |
| 2002/0123897 A1* | 9/2002 | Matsumoto | G10L 13/06 704/500 |
| 2002/0138669 A1* | 9/2002 | Kadatch | G06F 1/3203 710/5 |
| 2002/0172429 A1* | 11/2002 | Boliek | H03M 7/30 382/240 |
| 2004/0202340 A1* | 10/2004 | Armstrong | H04R 25/30 381/312 |

(Continued)

OTHER PUBLICATIONS

Mel, et al. "The NIST Definition of Cloud Computing". Recommendations of the National Institute of Standards and Technology. Nov. 16, 2015.

(Continued)

*Primary Examiner* — Mohammad S Rostami
(74) *Attorney, Agent, or Firm* — Anthony Curro, Esq.; McGinn IP Law Group, PLLC

(57) ABSTRACT

A compression method, system, and computer program product include creating compressed data via a first system from input data, sending information to a second system detailing a compression strategy for the compressed data, and learning, via the second system, from the information how to recreate the input to the first system using the compressed data.

12 Claims, 6 Drawing Sheets

(56) References Cited

U.S. PATENT DOCUMENTS

| | | | | |
|---|---|---|---|---|
| 2004/0264719 | A1* | 12/2004 | Naylor | H04R 25/70 381/314 |
| 2007/0244695 | A1* | 10/2007 | Manjunath | G10L 19/24 704/201 |
| 2008/0037880 | A1* | 2/2008 | Lai | H04N 19/172 382/232 |
| 2008/0112489 | A1* | 5/2008 | Malladi | H04N 19/176 375/240.22 |
| 2008/0263244 | A1* | 10/2008 | Mizuno | G06F 3/0608 710/68 |
| 2009/0041234 | A1* | 2/2009 | Gruba | H04L 9/06 380/42 |
| 2009/0157712 | A1* | 6/2009 | De Peuter | H03M 7/30 |
| 2010/0196861 | A1* | 8/2010 | Lunner | H04R 25/505 434/112 |
| 2010/0226441 | A1* | 9/2010 | Tung | H04N 21/2343 375/240.24 |
| 2011/0161119 | A1* | 6/2011 | Collins | G06Q 40/08 705/4 |
| 2011/0258508 | A1* | 10/2011 | Ivkovic | H03M 13/1105 714/752 |
| 2013/0301711 | A1* | 11/2013 | Agthe | H04N 19/159 375/240.03 |
| 2013/0325828 | A1* | 12/2013 | Larson | G06F 16/2365 707/703 |
| 2015/0085876 | A1* | 3/2015 | Chhatriwala | H04W 28/06 370/465 |
| 2015/0371406 | A1 | 12/2015 | Amit et al. | |
| 2015/0379427 | A1* | 12/2015 | Dirac | G06N 20/00 706/12 |
| 2015/0379429 | A1* | 12/2015 | Lee | G06N 20/00 706/11 |
| 2015/0380005 | A1* | 12/2015 | Chesney | H03M 3/428 704/500 |
| 2016/0078361 | A1* | 3/2016 | Brueckner | H04L 67/10 706/12 |
| 2016/0155478 | A1 | 6/2016 | Puri et al. | |
| 2016/0205341 | A1 | 7/2016 | Hollander et al. | |
| 2016/0294410 | A1* | 10/2016 | Bhaskar | H03M 7/3088 |
| 2016/0314354 | A1 | 10/2016 | Teuton et al. | |
| 2017/0078680 | A1* | 3/2017 | Coward | H04N 19/139 |
| 2017/0185529 | A1* | 6/2017 | Chhabra | G06F 3/0685 |
| 2017/0345130 | A1* | 11/2017 | Wang | G06T 3/4046 |
| 2018/0181626 | A1* | 6/2018 | Lyons | G06F 16/288 |
| 2018/0199066 | A1* | 7/2018 | Ross | G06N 3/08 |
| 2018/0247227 | A1* | 8/2018 | Holtham | G06N 3/0454 |
| 2018/0327699 | A1* | 11/2018 | Ota | G01N 21/01 |

OTHER PUBLICATIONS

Cohen, W.W., & Singer, Y. (1999). "Context-sensitive learning methods for text categorization". ACM Transactions on Information Systems (TOIS), 17(2), 141-173.

Marpe, D., Blattermann, G., Heising, G., & Wiegand, T. (2001). "Video compression using context-based adaptive arithmetic coding". Image Processing, 2001. Proceedings. 2001 International Conference (3), 558-561.

Timmerer, C., Kofler, I., Liegl, J., & Hellwagner, H. (2005). "An evaluation of existing metadata compression and encoding technologies for MPEG-21 applications". Multimedia, Seventh IEEE International Symposium on (pp. 6-pp).

* cited by examiner

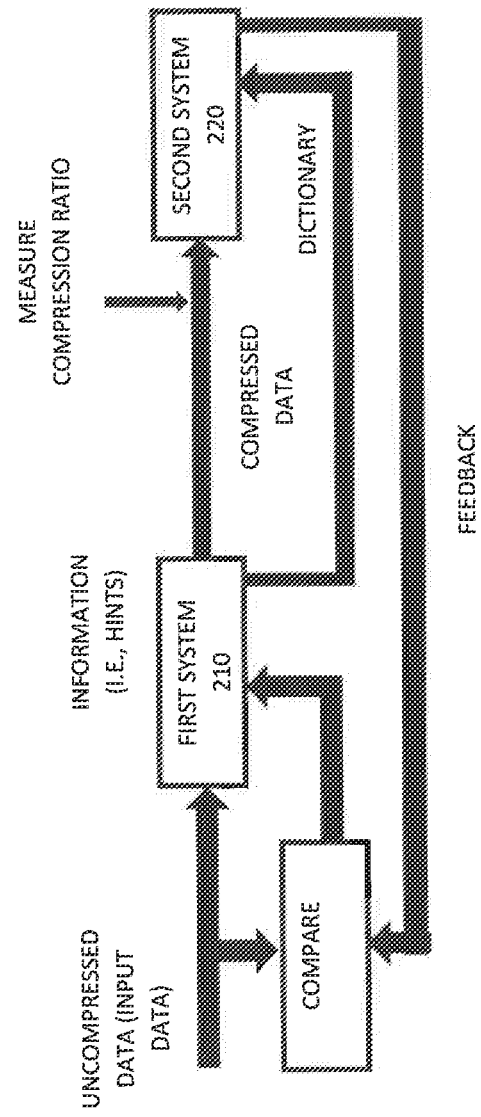

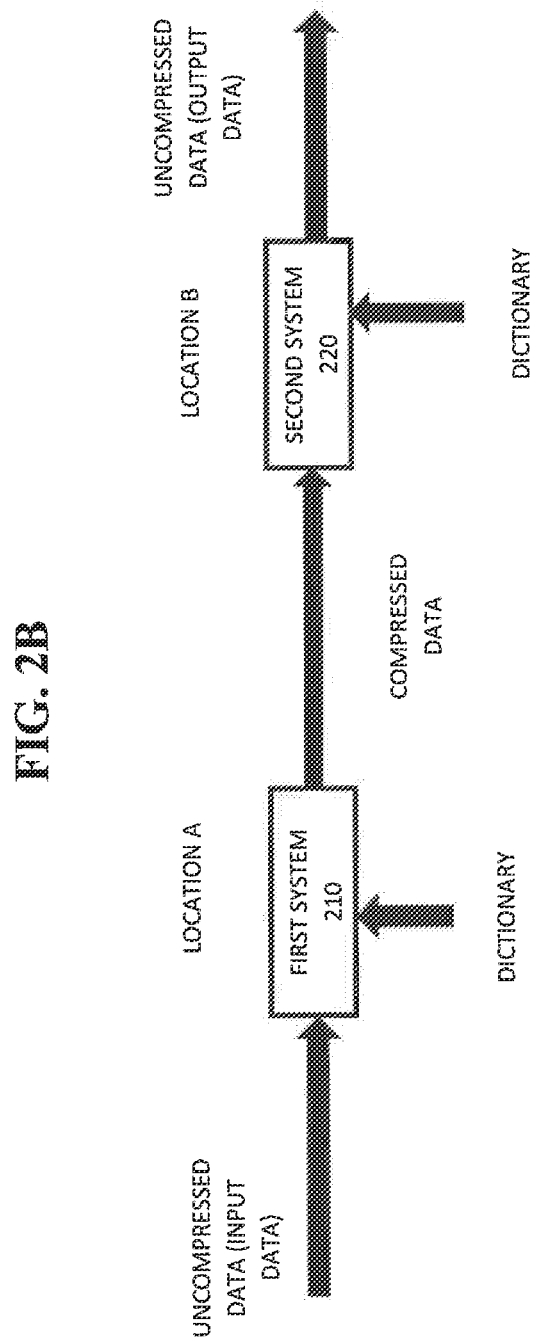

DATA COMPRESSION BY USING COGNITIVE CREATED DICTIONARIES

BACKGROUND

The present invention relates generally to a cognitive data compression method applicable to a cloud computing environment, and more particularly, but not by way of limitation, to a system, method, and computer program product for data compression by creating compressed data of a minimum size with an effort level of decoding, where the effort level is dependent on the number of computing steps of the target decoding system.

Compression is conventionally performed by software programs that use a formula or algorithm to determine how to shrink the size of the data. For example, an algorithm may represent a string of bits, or 0's and 1's, with a smaller string of 0's and 1's by using a dictionary for the conversion between them, or the formula may insert a reference or pointer to a string of 0s and 1s that the program has already seen. Also, compressing data can be a lossless or lossy process in that lossless compression enables the restoration of a file to its original state, without the loss of a single bit of data, when the file is uncompressed and lossy compression permanently eliminates bits of data that are redundant, unimportant or imperceptible.

However, the conventional lossless data compression is based on recoding the data to reduce redundancy based on the Shanon Theorem. The redundancy is a formal redundancy looking at the used symbols and does not take in account that there is also redundancy based on the context.

SUMMARY

In an exemplary embodiment, the present invention can provide a computer-implemented compression method, the method including creating compressed data via a first system from input data, sending information to a second system detailing a compression strategy for the compressed data, learning, via the second system, from the information how to recreate the input to the first system using the compressed data. One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways that should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIGS. 2A-B exemplarily depicts a cognitive learning system with two subsystems according to an embodiment of the present invention;

DETAILED DESCRIPTION

Figure 1:
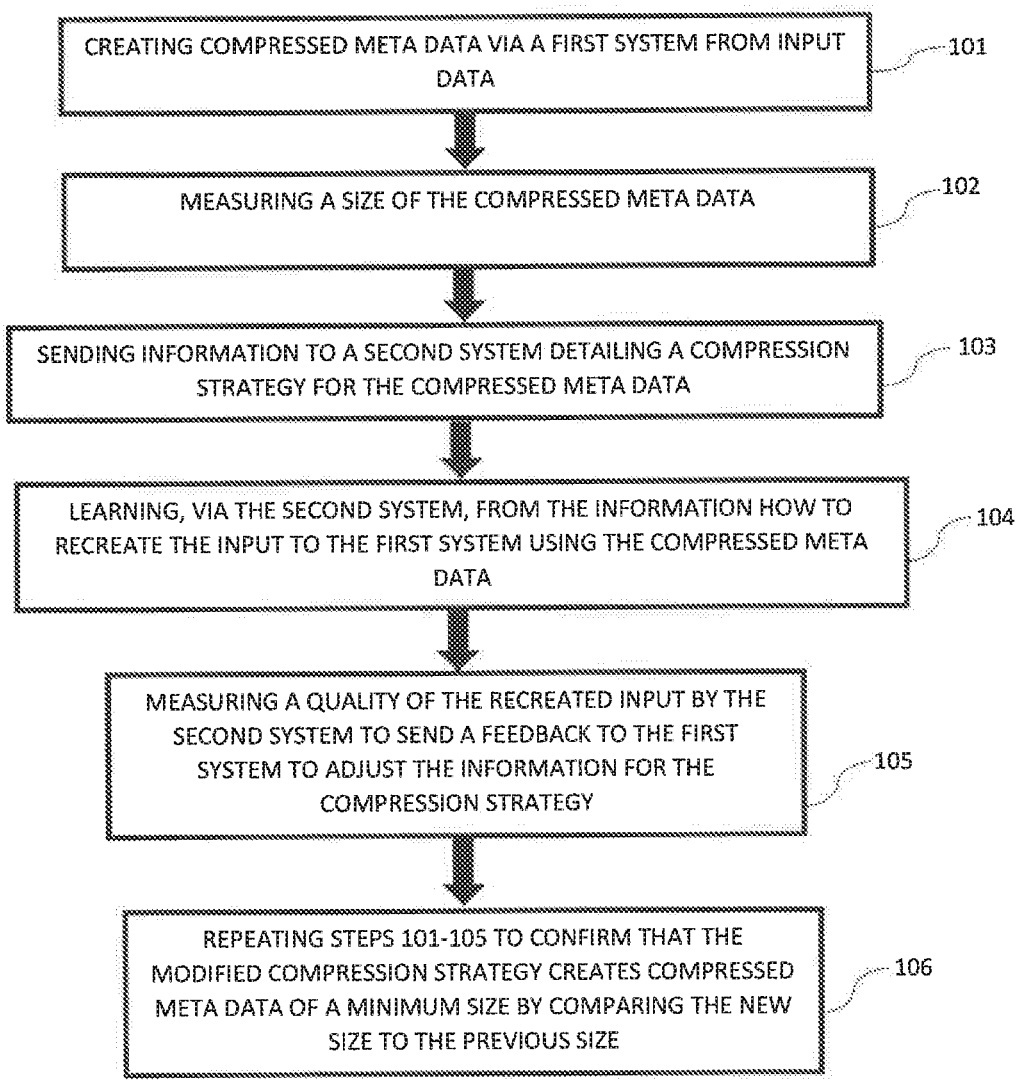
FIG. 1 exemplarily shows a high-level flow chart for a compression method 100 according to an embodiment of the present invention.

The invention will now be described with reference to FIGS. 1-5, in which like reference numerals refer to like parts throughout. It is emphasized that, according to common practice, the various features of the drawings are not necessarily to scale. On the contrary, the dimensions of the various features can be arbitrarily expanded or reduced for clarity.

By way of introduction of the example depicted in FIG. 1, an embodiment of a cognitive data compression method 100 according to the present invention can include two subsystems in a feedback loop, which represent the encoder, which converts original data to compressed data (compressor), and a decoder, which converts the compressed data back to the original data (decompressor), where the subsystems are trained without training data/pre-annotated data. The input to the compressor is compared to the output of the decompressor, where the result should be the same. The subsystems compress as much data as possible, while still resulting in the same output, so that both subsystems are continuously training/learning from each other (rather than learning from provided training examples) and providing feedback to each other to improve the compression rate.

Figure 3:
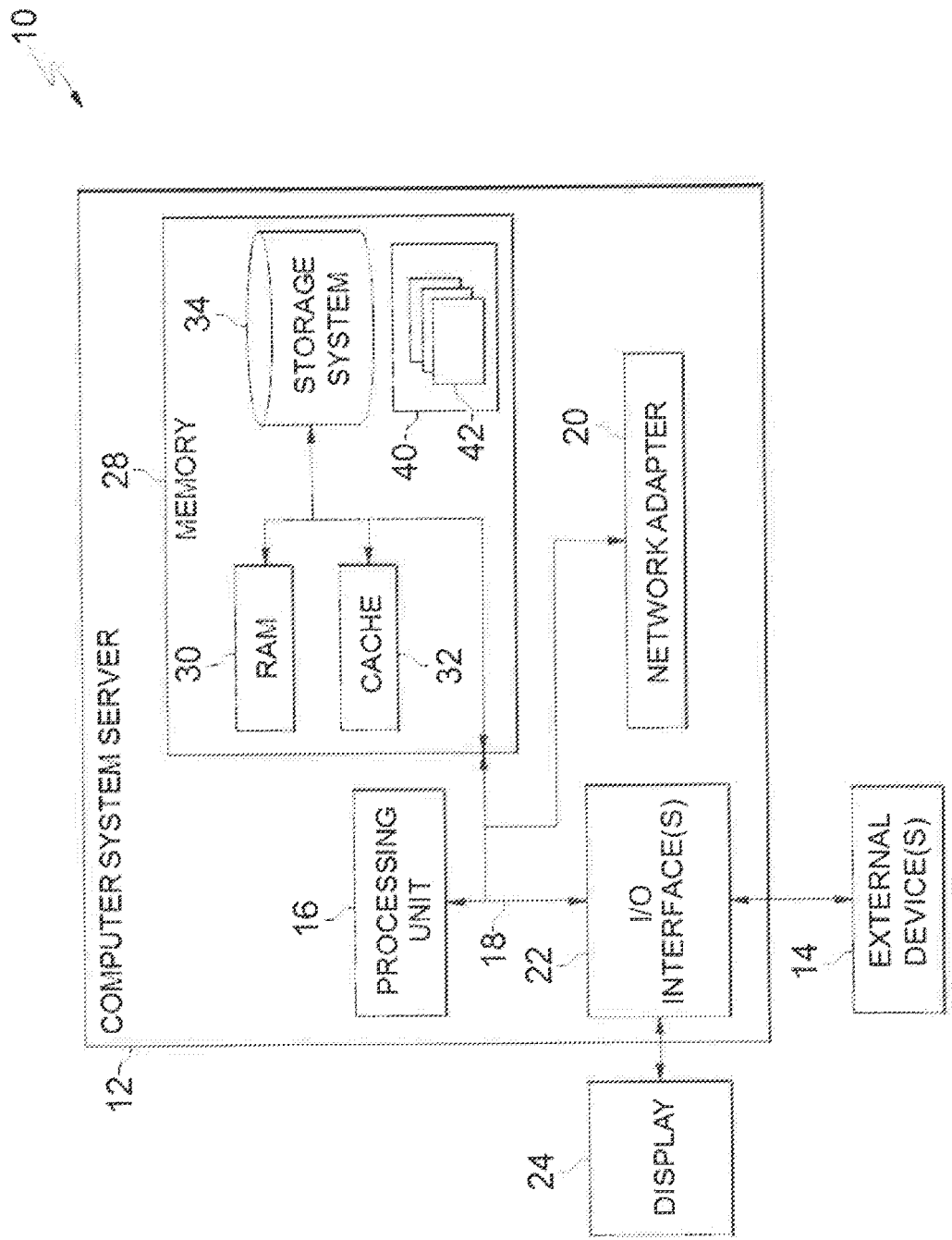
FIG. 3 depicts a cloud-computing node 10 according to an embodiment of the present invention.

By way of introduction of the example depicted in FIG. 3, one or more computers of a computer system 12 according to an embodiment of the present invention can include a memory 28 having instructions stored in a storage system to perform the steps of FIG. 1.

With reference to FIGS. 1 and 2A-B, in step 101, compressed data is created via a first system 210 from input data. The first system 210 can include an encoder which converts the original input data to the compressed data. Entropy compression algorithms could be part of the compression (e.g., as a post processing step after cognitive compression).

In step 102, a size of the compressed data is measured.

In step 103, information (e.g., such as a decoding hint) is sent as meta data along with the compressed data to a second system 220 detailing a compression strategy for the compressed data. That is, the first system 210 sends information to the second system 220 about details of the compression as decoding hints. For example, grammar and spelling rules used to compress the data by the first system 210 can be sent to the second system 220 and can be replaced by shape recognition (e.g., the system can learn how to detect a car or house and how to parameterize it most efficiently for the given type of picture like paintings or photos). Or, in videos, movement can be used as a context for the compression (e.g., if cars are observed on a junction the cars always move in a defined direction related to the position of the street. A violation of the general rule can be handle as a special compression case. If the data will be analyzed later this special compression case can be use of events of special interest for e.g. the police to find a special event faster than to watch the whole video from the beginning). Or, for example, a cognitive approach knows that a word is a verb, adjective, noun, etc. and the grammar context. Hence, the information for the compressed can reduce a phrase to its basic information and add a tag describing the grammar context. The language or dictionary can be sent as the information but the dictionary can be trained over time from the information. Thereby, this increases the redundancy of the processes text because many different words where translated to their basic form while the grammar context makes it possible to convert the same basic word to different derived forms based on the grammar context.

In step 104, via the second system 220, is it learned from the information how to recreate the input from the first system 210 using the compressed data. The compressed data is processed by the second system 220 using the information to create the original data (i.e., the input).

In step 105, a quality of the recreated input is measured by the second system 220 to send a feedback to the first system 210 to adjust the information for the compressed strategy. The second system 220 sends feedback to the first system 210 about the effort of decoding (e.g., if the effort is very high or it was impossible to create unambiguous original data using the information sent). That is, the output from the second system 220 is compared to the input to the first system 210. Depending on the quality (i.e., the difference between the input and output), feedback is sent to the first system 210 about how the second system 220 was unable (or able) to decode the compressed data. In other words, the first system 210 teaches the second sub-system how to decode the meta data using the information as a hint while the second system 220 teaches the first system 210 through the feedback about the quality of the teaching. Thereby, there is a dual channel teaching between both the compressor and de-compressor to optimize the size of the compressed data.

In step 106, steps 101-105 are repeated to confirm that the modified compression strategy creates the compressed data of a minimum size by comparing the new size with the new compress strategy to the previous size with the previous compression strategy. That is, after the first system 210 receives a feedback from the second system 220, the first system 210 updates the information used for compressing the input to the compressed data and sends the updated information. The second system 220 uses the newly compressed data and the updated information to decompress the compressed data. The quality is measured and if the quality exceeds a predetermined threshold, the information does not need to be sent anymore to the second system 220 since the second system 220 already has learned the information used to decompress the compressed data.

That is, the information is continuously sent until the second system 220 has an optimal decompression rate of the compressed data then the second system 220 no longer needs the information since the information is already known. Until new information is used to compress the data, no new information needs to be sent to the second system 220. Therefore, when the feedback loop reaches its optimal point the training process will stop with the result of a dictionary of metadata to compress data. This dictionary of metadata (i.e., the information) will further be used to compress/decompress new data streams such that the information does not need to be continuously sent with the compressed data to the second system 220.

Thus, compressed data of minimum size with reasonable effort of decoding can be created. The meaning of reasonable depends on the use case (e.g., the number of reasonable computing steps will be different if the target decoding system is a mainframe, a PC or a mobile device). For example, if the system should be used to compress the data of a library for scientific astronomical publications (e.g., first information is the publications used to compress the data), it must be trained with existing data of this class (e.g., the publications are transmitted to the second system 220 as the hints for decoding). New publications about this type of information (scientific astronomical publications) will be processed very efficiently. Or, if the second system 220 cannot understand the new types of scientific publications because the quality is below a certain level, the feedback necessitates that the new information is sent with the compressed data to update the second system 220.

That is, in an operational process as depicted in FIG. 2B, the information no longer needs to be sent with the compressed data. Each location (A/B) already "knows" the dictionary for compressing/decompressing data and only the compressed data needs to be sent.

If the method must learn the processing of new data it can use the results from related learned processes (e.g., if the system has learned to process scientific astronomical publications it can use this information as a good starting point to learn the compression of other scientific publications in physics or of publications in popular science magazines). The other publications can be sent as part of additional information as the hints to decompress the compressed data.

In one exemplary embodiment, the first system 210 can compress the phrase "Smoking is dangerous because smoke is dangerous but I smoked yesterday a lot." Cognitive processing is used increase redundancy what improves the compression rate (e.g., only the words derived from smoke) and the information of the language used is sent to the second system 220. Thus, the phrase is reduced to "smoke is dangerous (Gerund tag) because smoke is dangerous (present tense tag) but I smoke yesterday a lot (past tense tag)". The second system 220 can receive the information about the language and grammar rules and create the original text (i.e., 1) smoke is Smoking because it is the first word in the phrase and it is a gerund, 2) smoke is smoke because it present tense, and 3) smoke is smoked because it is past tense).

In another exemplary embodiment, for movie compression, a car is driving on the street and there is a traffic light. In cognitive compression, as long the traffic light is green the car will not change its speed significantly. If the traffic light is changing to yellow and then red the call will reduce its speed until it stays with a probability of nearly 100%. These rules are sent with the compressed data as the information or the second system 220 to decompress the data into the original input.

In other words, the method 100 can provide a first system 210 applying metadata to a process to create an output from an input and a second system 220 learns from the metadata how to recreate the input from the first system 210 using the output. Or instead recreating the input data how to detect hidden information not known to the second system but known in the total system, especially the measurement unit. A measurement unit to measure the quality of the recreated input data/detected hidden information. The feedback subsystem teaches the first sub-system based on its knowledge of the measured quality, metadata, input and output data. The data can be a set of unstructured data of a special type like a text book about physics (category 1), chemistry (category 2), surveilling videos from a street (category 3) pictures from people in the forest (category 4), etc. The systems can be, for example, neuronal networks or cognitive expert systems like Watson. The systems can use an external data source like pre-defined data or the internet. The external data source enables the system to use a good starting point for the training feedback loop.

Thereby, the above embodiments can provide a method for cognitive data compression, by creating compressed data of minimum size with an effort level of decoding, where the effort level is dependent on the number of computing steps of the target decoding system (i.e. PC, mainframe have more steps than a mobile device). The method includes at least two systems in a feedback loop, which represent the encoder, which converts original data to compressed data (compressor), and a decoder, which converts the compressed data back to the original data (decompressor), where the systems are trained without training data/pre-annotated data. The input to the compressor is compared to the output of the decompressor, where the result should be the same. The systems compress as much data as possible, while still resulting in the same output, so that both subsystems are continuously training/learning from each other (rather than learning from provided training examples) and providing feedback to each other to improve the compression rate.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of distributed computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 3, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or more program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 4:
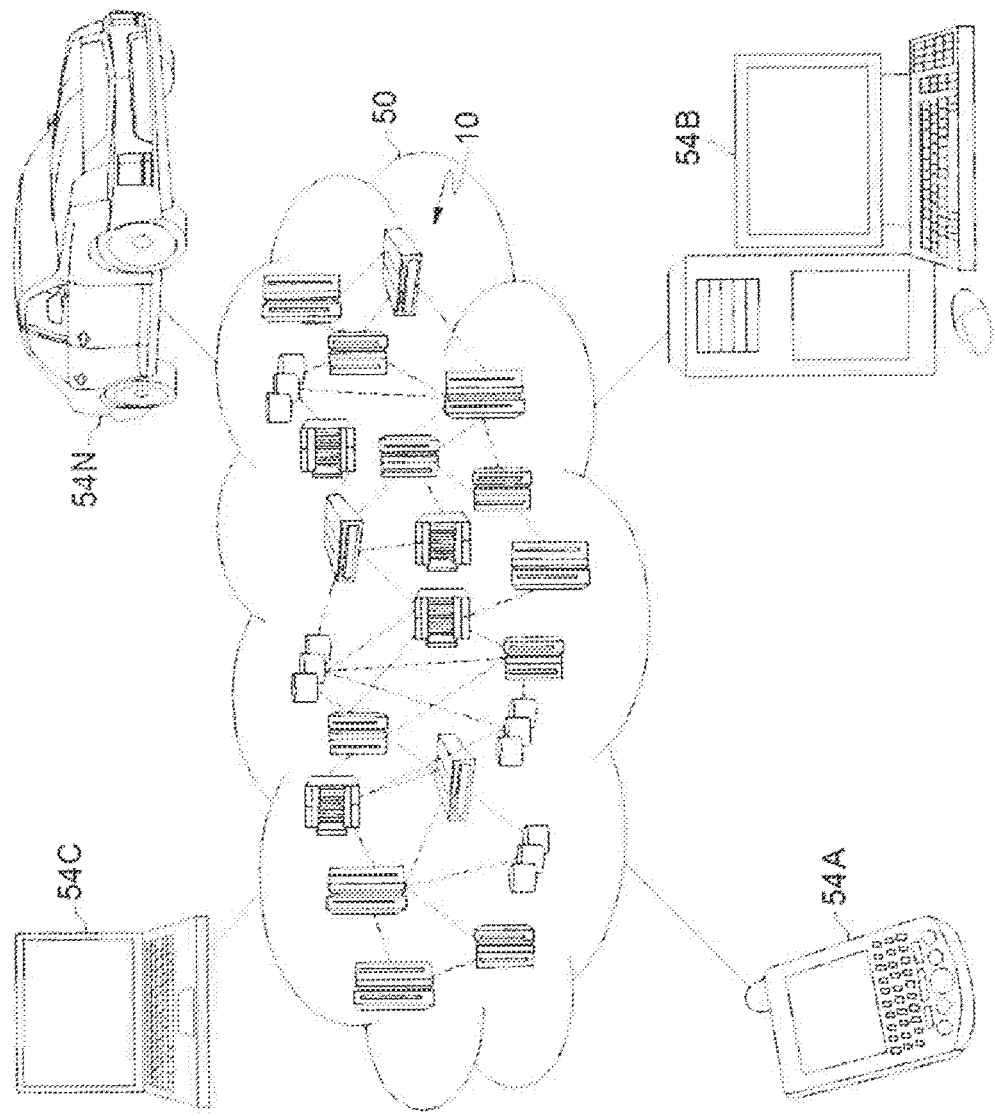
FIG. 4 depicts a cloud-computing environment 50 according to an embodiment of the present invention.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Figure 5:
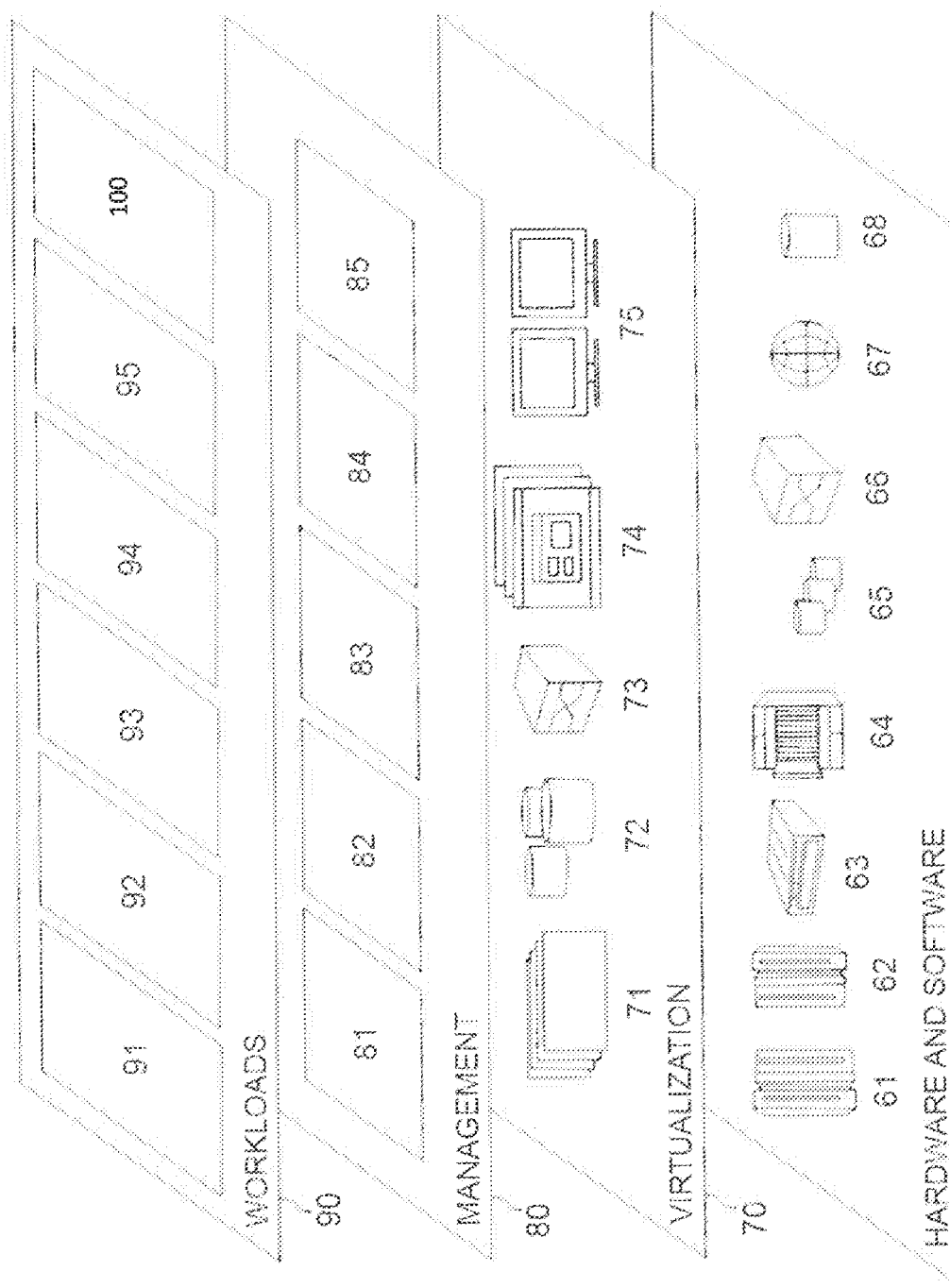
FIG. 5 depicts abstraction model layers according to an embodiment of the present invention.

Referring now to FIG. 5, an exemplary set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and compression method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), a Storage Area Network (SAN), a Network Attached Storage (NAS) device, a Redundant Array of Independent Discs (RAID), an erasable programmable read-only memory (EPROM or Flash memory), a static random access memory (SRAM), a portable compact disc read-only memory (CD-ROM), a digital versatile disk (DVD), a memory stick, a USB "thumb" drive, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented compression method, the method comprising:
   creating compressed data via a first system from input data;
   sending information to a second system detailing a compression strategy for the compressed data;
   learning, via the second system, from the information how to recreate the input to the first system using the compressed data;
   decompressing, via the second system, the compressed data to a recreated input;
   comparing the input data to the first system with the recreated input in an iterative loop;
   based on a result of the comparing and the iterative loop of the comparing, modifying the information at each iterative loop how to recreate the input such that the input data to the first system matches the recreated input; and
   sending a feedback to the first system based on the recreated input by the second system,
   wherein the first system teaches the second system how to recreate the input simultaneously while the second system teaches the first system an effectiveness of the teaching that the first system provides to the second system,
   further comprising measuring a quality of the recreated input by the second system to send a feedback to the first system to adjust the information for the compression strategy,
   wherein the information is not sent to the second system with a next compressed data when the quality is greater than a predetermined threshold value,
   wherein the first system and the second system are trained by the learning and feedback without training data and/or pre-annotated data,
   wherein the input data comprises a set of unstructured data of special types having multiple categories to classify each of the special types into one of the multiple categories, and
   wherein the first system and the second system comprise a neuronal network or a cognitive expert.

2. The computer-implemented method of claim 1, further comprising:
   measuring a size of the compressed data; and
   if the compression strategy is modified, repeating the creating, the learning, and the sending to confirm that the modified compression strategy creates compressed data including a minimum size by comparing a new size to the measured size.

3. The computer-implemented method of claim 1, wherein the compressed data is created with a minimum size with an effort level of decoding, the effort level of decoding is dependent on a number of computing steps of the second system.

4. The computer-implemented method of claim 1, wherein the feedback is sent to the first system if the recreated input and the input do not match.

5. The computer-implemented method of claim 1, further comprising:
   if the compression strategy is modified, repeating the creating, the learning, and the sending to confirm that the modified compression strategy creates compressed data including a minimum size by comparing a new size to the measured size,
   wherein the information is not sent to the second system with a next compressed data when the quality is greater than a predetermined threshold value.

6. The computer-implemented method of claim 1, further comprising:
   measuring a size of the compressed data; and
   if the compression strategy is modified, repeating the creating, the learning, and the sending to confirm that the modified compression strategy creates compressed data including a minimum size by comparing a new size to the measured size,
   wherein the compressed data is created with a minimum size with an effort level of decoding, the effort level of decoding is dependent on a number of computing steps of the second system, and
   wherein the feedback is sent to the first system if the recreated input and the input do not match.

7. A computer program product for compression, the computer program product comprising a computer-readable storage medium having program instructions embodied therewith, the program instructions executable by a computer to cause the computer to perform:

creating compressed data via a first system from input data;

sending information to a second system detailing a compression strategy for the compressed data;

learning, via the second system, from the information how to recreate the input to the first system using the compressed data;

decompressing, via the second system, the compressed data to a recreated input;

comparing the input data to the first system with the recreated input in an iterative loop;

based on a result of the comparing and the iterative loop of the comparing, modifying the information at each iterative loop how to recreate the input such that the input data to the first system matches the recreated input; and sending a feedback to the first system based on the recreated input by the second system, wherein the first system teaches the second system how to recreate the input simultaneously while the second system teaches the first system an effectiveness of the teaching that the first system provides to the second system, further comprising measuring a quality of the recreated input by the second system to send a feedback to the first system to adjust the information for the compression strategy, wherein the information is not sent to the second system with a next compressed data when the quality is greater than a predetermined threshold value, wherein the first system and the second system are trained by the learning and feedback without training data and/or pre-annotated data, wherein the input data comprises a set of unstructured data of special types having multiple categories to classify each of the special types into one of the multiple categories, and wherein the first system and the second system comprise a neuronal network or a cognitive expert.

8. The computer program product of claim 7, further comprising:

measuring a size of the compressed data; and if the compression strategy is modified, repeating the creating, the learning, and the sending to confirm that the modified compression strategy creates compressed data including a minimum size by comparing a new size to the measured size.

9. The computer program product of claim 7, wherein the compressed data is created with a minimum size with an effort level of decoding, the effort level of decoding is dependent on a number of computing steps of the second system.

10. The computer program product of claim 7, wherein the recreated input by the second system is compared with the input to the first system, and the feedback is sent to the first system if the recreated input and the input do not match.

11. A compression system, said system comprising:

a processor; and a memory, the memory storing instructions to cause the processor to perform:

creating compressed data via a first system from input data;

sending information to a second system detailing a compression strategy for the compressed data;

learning, via the second system, from the information how to recreate the input to the first system using the compressed data;

decompressing, via the second system, the compressed data to a recreated input;

comparing the input data to the first system with the recreated input in an iterative loop;

based on a result of the comparing and the iterative loop of the comparing, modifying the information at each iterative loop how to recreate the input such that the input data to the first system matches the recreated input; and sending a feedback to the first system based on the recreated input by the second system, wherein the first system teaches the second system how to recreate the input simultaneously while the second system teaches the first system an effectiveness of the teaching that the first system provides to the second system, further comprising measuring a quality of the recreated input by the second system to send a feedback to the first system to adjust the information for the compression strategy, wherein the information is not sent to the second system with a next compressed data when the quality is greater than a predetermined threshold value, wherein the first system and the second system are trained by the learning and feedback without training data and/or pre-annotated data, wherein the input data comprises a set of unstructured data of special types having multiple categories to classify each of the special types into one of the multiple categories, and wherein the first system and the second system comprise a neuronal network or a cognitive expert.

12. The system of claim 11, embodied in a cloud-computing environment.

* * * * *